United States Patent [19]

Mayer et al.

[11] 4,101,082

[45] Jul. 18, 1978

[54] ELECTRIC MOTOR-DRIVEN COFFEE MILL

[75] Inventors: Rolf Mayer; Max Speckhart, both of Giengen, Germany

[73] Assignee: Bosch-Siemens Hausgerate GmbH, Stuttgart, Germany

[21] Appl. No.: 792,864

[22] Filed: May 2, 1977

[30] Foreign Application Priority Data

May 11, 1976 [DE]  Fed. Rep. of Germany ....... 2620800
May 15, 1976 [DE]  Fed. Rep. of Germany ....... 2621681

[51] Int. Cl.² ............................................. B02C 18/24
[52] U.S. Cl. .................................. 241/282.1; 310/43; 310/258
[58] Field of Search ............... 241/199.12, 277, 282.1, 241/282.2; 310/43, 179, 180, 258, 269

[56] References Cited

U.S. PATENT DOCUMENTS

| | | | |
|---|---|---|---|
| 2,822,485 | 2/1958 | Braun et al. | 310/258 X |
| 2,982,483 | 5/1961 | Heinemans | 241/282.1 UX |
| 3,612,414 | 10/1971 | Nevison et al. | 241/199.12 |
| 3,737,988 | 6/1973 | Bednarski | 310/43 X |

FOREIGN PATENT DOCUMENTS

| | | | |
|---|---|---|---|
| 2,312,355 | 9/1974 | Fed. Rep. of Germany | 241/282.1 |
| 1,160,040 | 7/1969 | United Kingdom | 241/282.1 |

*Primary Examiner*—Roy Lake
*Assistant Examiner*—Howard K. Goldberg
*Attorney, Agent, or Firm*—Herbert L. Lerner

[57] ABSTRACT

An electric motor-driven coffee mill having a housing, a circular grinding cup obliquely arranged in the housing, a beater blade rotatably supported above the bottom of the cup, and below the bottom of the cup, a salient-pole motor with an asymmetrically arranged field coil having an inclined axis that the field coil extends on one side beyond the projection of the cup perpendicular to inclined plane of the oblique cup, and the contours of the motor lie inside a cylinder formed by the projection of the cup extending down vertically from the inclined plane of the oblique cup. Other features relate to the disposition of the motor in a plastic frame, a flat commutator and carbon brushes held by leaf springs, and double insulation around the shaft to shield it from its rotor. More efficient, economical coffee mills with greater electrical safety are thereby provided.

12 Claims, 10 Drawing Figures

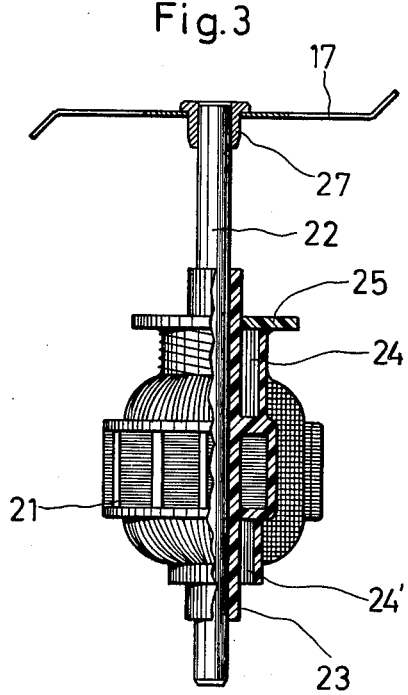
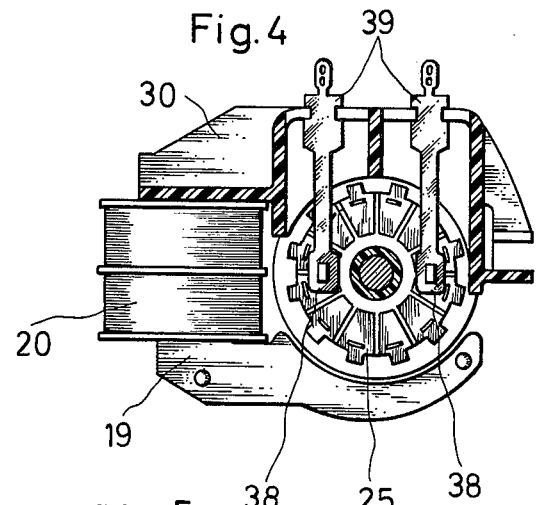
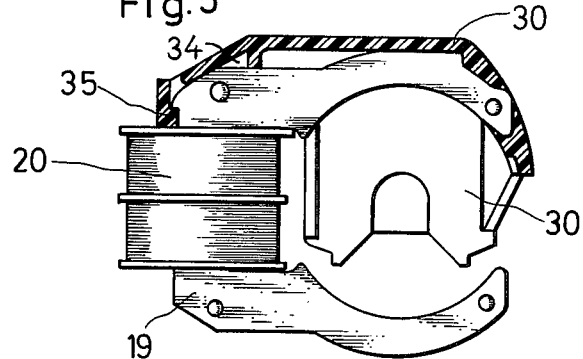
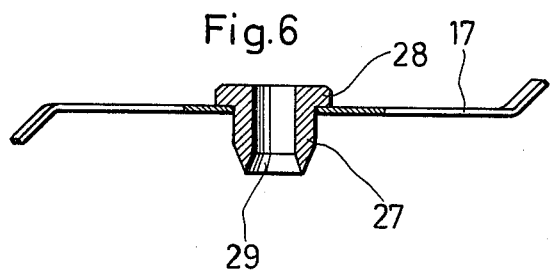
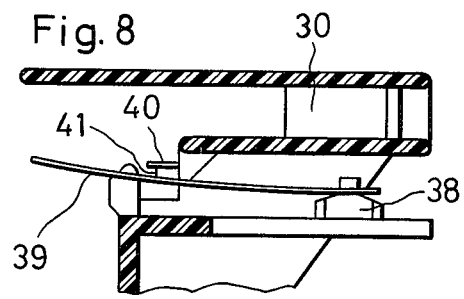
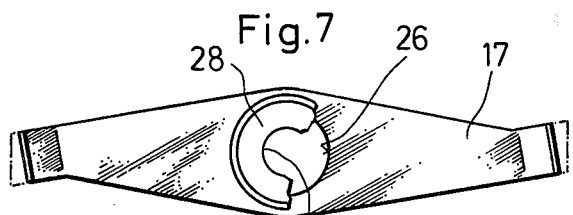
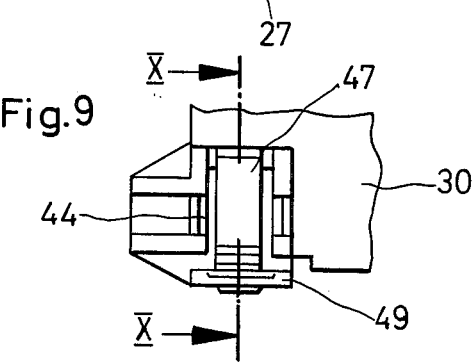
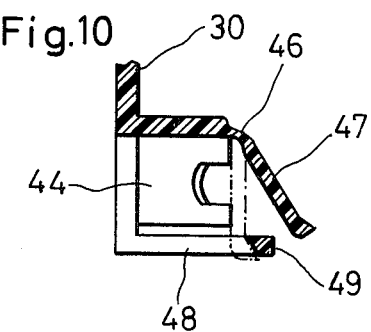

ELECTRIC MOTOR-DRIVEN COFFEE MILL

BACKGROUND OF THE INVENTION

1. Field of the Invention

The invention relates to a coffee mill and more particularly refers to a new and improved coffee grinder driven by an electric motor having a housing and a grinding cup arranged therein, and a comminuting tool rotatably supported above the bottom of the cup, driven by a drive motor beneath the bottom of the grinding cup.

2. Description of the Prior Art

Customarily, single-phase series motors with closed annular stators are used as the drive motors of coffee mills. While such motors are symmetrical and compact, they unfortunately are relatively expensive. Salient-pole motors with an asymmetrically arranged field coil are inexpensive compared to the single-phase series motors but due to difficulties and disadvantages which result from the mounting of its unilaterally far-out projecting field coil, particularly with respect to greater space requirement, have not found great favor for this usage. In addition problems are involved in the connection between the beater blade and the shaft of the drive motor to ensure electrical safety.

SUMMARY OF THE INVENTION

An object of the present invention is to provide a coffee mill driven by an economically producible, inexpensive salient-pole motor and to eliminate the difficulties and disadvantages which result from the mounting of its unilaterally far-out projecting field coil, with respect to a greater space requirement.

Another object of the invention is to provide a coffee mill in which the connection between the beater blade and the shaft of the drive motor is simplified and at the same time the electrical safety of the coffee grinder is increased.

With the foregoing and other objects in view, there is provided in accordance with the invention an electric motor-driven coffee mill having a housing with a grinding cup disposed therein above the bottom of the housing, a drive motor in the housing disposed beneath the bottom of the grinding cup, and a rotatably supported comminuting tool disposed above the bottom of the grinding cup and driven by the drive motor, the grinding cup being at least approximately circular and obliquely arranged in the housing, the drive motor being a salient-pole motor with an asymmetrically arranged field coil, the axis of the salient-pole motor being inclined such that the field coil extends on one side beyond a projection of the cup perpendicular to the oblique plane of the grinding cup, and the contours of the salient-pole motor lie inside a cylinder formed by a projection of the cup perpendicular to a horizontal plane.

The salient-pole motor is advantageously supported in a frame frabricated as a connected plastic part, which frame supporting the motor is clamped with the interposition of resilient support elements between the bottom of the inclined grinding cup braced in the housing and the bottom of the housing.

The drive motor preferably has its shaft insulated from its rotor with double plastic insulation against its shaft, and said comminuting tool has a central hole with a metal bushing pressed in the hole, which bushing is placed on the shaft.

The rotor of the drive motor is desirably equipped with a disk-type commutator which has a central hole and is pulled onto a hub formed by a plastic spray coating around the shaft, the commutator being supported on its bottom side on the edge of a section of the double insulation enclosing a cavity.

Other features which are considered as characteristic for the invention are set forth in the appended claims.

Although the invention is illustrated and described herein as embodied in an electric motor-driven coffee mill, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 3 is a partial cross section, in the actual scale somewhat enlarged over FIGS. 1 and 2, of the rotor of the drive motor with the shaft doubly insulated therefrom by a plastic spray coating and the beater blade pressed onto its upper end section, and FIG. 4 is a partial cross section perpendicular to its axis of the drive motor with the rotor, in actual scale, of the coffee mill with a plastic frame surrounding it, taken along line IV—IV of FIG. 1, and FIG. 5 is a partial cross section perpendicular to its axis of the drive motor without the rotor in actual scale, of the coffee mill, with a plastic frame surrounding it, taken along V—V of FIG. 1, and FIGS. 6 and 7 show the beater blade with the bushing serving to fasten it, as seen from the side and from the top, on a scale enlarged over FIGS. 3 to 5, and FIG. 8 shows the upper section of the plastic frame in section containing the drive motor with a leaf spring clamped thereon and carrying a carbon brush, taken along line VIII—VIII of FIG. 2, and FIG. 9 shows the lower left section of the plastic frame containing the drive motor with the formed-on stress relief for the power supply cable, and FIG. 10 shows the stress relief on an enlarged scale, in the open and closed position, taken along line X—X of FIG. 9.

DETAILED DESCRIPTION OF THE INVENTION

In accordance with the invention, a salient-pole motor with an asymmetrically arrranged field coil, which extends on one side beyond the vertical projection, i.e. a projection which is perpendicular to the plane of inclination of the grinding cup is used as the drive motor and the shaft of the salient-pole motor is inclined in such a manner that the contours of the motor are within a cylinder formed by the oblique projection of the grinding cup, i.e. a projection which is perpendicular or vertical to a horizontal plane. The rotor of the drive motor is provided with double insulation from its shaft by a plastic spray-coating, while the beater blade, provided with a central hole, is pushed onto the shaft indirectly by means of a metal bushing that can be plugged into the hole.

By means of the salient-pole motor, which is arranged with an inclined axis in accordance with the invention, the dimensions of the housing of the coffee mill are minimized with substantial reduction of the manufacturing costs of such a coffee mill while also retaining its handiness based on its small overall dimensions.

In addition, the electrical safety of the coffee grinder is increased in a simple manner due to the double insulation of the shaft from the rotor in accordance with the invention, so that the additional insulation which is otherwise customary between the beater blade and the stub of the shaft, can be dispensed with, and a simple and operationally reliable attachment of the beater blade to the shaft stub of the drive motor is ensured.

The salient-pole motor is supported in a frame designed as one connected plastic part which is clamped with the interposition of resilient support elements between the bottom of the inclined grinding cup braced in the housing on the one hand and the bottom of the housing, on the other hand. This results in a design which is substantially simpler and more compact than in the known designs and which simplifies and substantially lowers the cost of a coffee grinder equipped with such a drive motor.

Reduction of particularly the length dimensions of the drive motor and therefore, also the entire coffee grinder and thus improving its handiness substantially, is obtained by equipping the salient-pole motor with a flat commutator in the form of a disk-type commutator, the carbon brushes of which are held by leaf springs which are clamped on one side at the frame supporting the drive motor.

Figure 1:
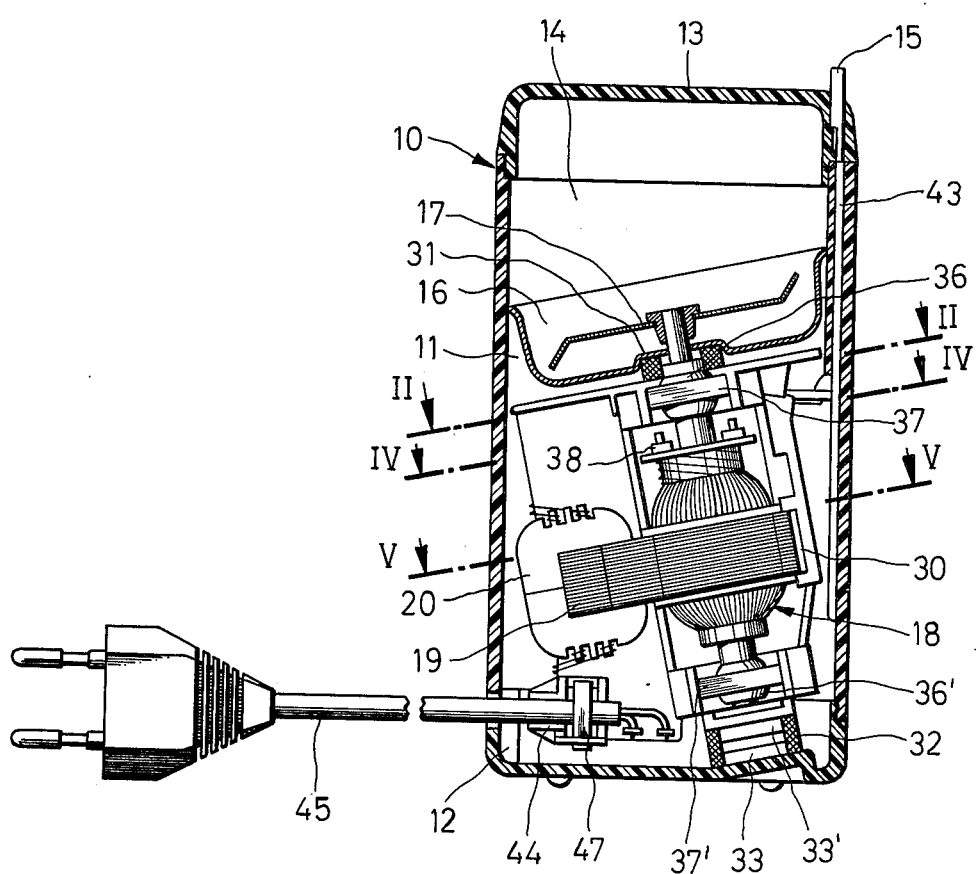
FIG. 1 is a cross-sectional side view of a beater blade coffee mill with a shallow grinding cup arranged inclined in its housing and a salient-pole motor mounted underneath with an inclined axis as the drive motor for the beater blade.
Figure 2:
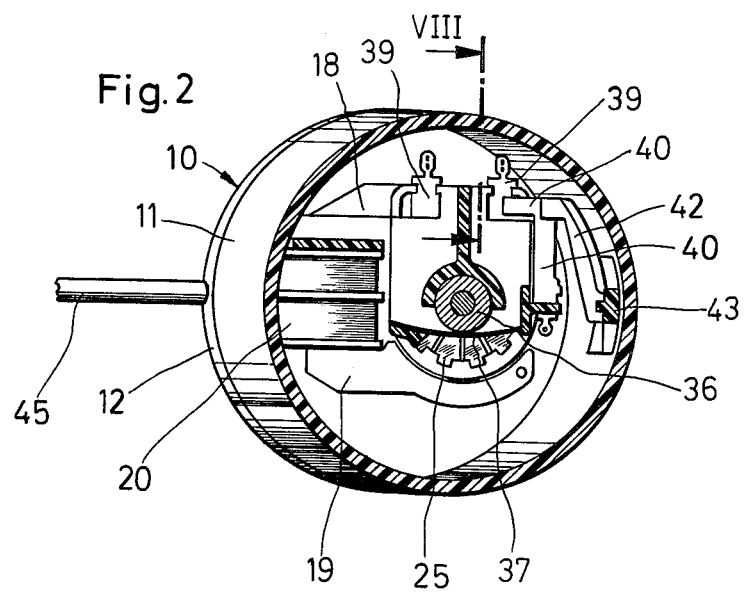
FIG. 2 is a cross section of the coffee mill perpendicular to the inclined axis of the salient-pole motor through its upper bearing taken along line II—II of FIG. 1.

As shown in FIG. 1 in a side view, a beater blade coffee grinder or mill 10 is driven by an electric motor and has a housing 11 with a bottom 12. The housing 11, which as a whole is designed in the form of a cylindrical shell with circular base can be closed by a dome-shaped cover 13 which, when placed on the top of the housing encloses with the upper section of the housing 11 a grinding chamber 14 to receive the material to be ground. At the cover 13, there is a switch plunger 15 serving as the actuating member for switching-on the coffee grinder 10. Further down, the grinding chamber 14 is confined by an obliquely arranged grinding cup 16, which makes tight contact with its rim along an annular bead disposed on the inside of the housing 11. Above the bottom of the grinding cup 16, a beater blade 17 is rotatably supported as the comminuting tool, which is driven by the drive motor 18 mounted underneath the bottom of the grinding cup.

The drive motor 18 is designed as a salient-pole motor with the stator 19, which has a U-shaped pole piece of stacked laminations. A field coil 20 is mounted on the yoke of the stator. The field coil 20 extends on one side far beyond the other radial dimensions of the drive motor 18. To compensate for its one-sided design, the axis of the drive motor 18 is inclined in such a manner that its contours are within a cylinder formed by oblique projection of the grinding cup 16. The oblique projection of the cup 16 is a projection downward vertically from the cup, i.e. a projection perpendicular to a horizontal plane, as contrasted to a projection of the cup, sometimes called vertical projection, perpendicular to the inclined or oblique plane of the cup. Where the cup is disposed horizontally, an oblique projection as defined does not exist. The shell of the housing 11 conforms to the cylinder formed by oblique projection of the grinding cup 16.

The drive motor 18 is equipped with a rotor 21, which is provided with double insulation 23, formed by a plastic spray coating, to insulate it from its shaft 22. The insulation 23 is designed so that it forms open, annular cavities 24 and 24′ toward the ends of the rotor 21. The cavity 24 is covered here by a flat collector 25 placed on the plastic insulation 23. The disk-type collector 25 with a central hole is pulled on a hub which surrounds the shaft. The hub is formed by plastic spray coating. The collector 25 is supported on the outside on the upper edge of a cylindrical section of the double insulation 23 enclosing the cavity 24.

The beater blade 17 is pressed indirectly by means of a metal bushing on the upper end section of the shaft 22. As can be seen, particularly from FIGS. 6 and 7, the beater blade 17 has a central hole 26 (FIG. 7), into which the metal bushing 27 is placed. The metal bushing 27 is provided with a shoulder 28, which rests against the end face of the beater blade 17, its rim zone surrounding the central hole 26. The end sections of the beater blade 17 are angled-off in opposite directions upward and downward.

The outside diameter of the bushing 27 is fitted into the central hole 26 in the beater blade 17 so that a sliding or clinging fit between the two parts is obtained. The inside diameter of the bushing 27, on the other hand, is matched to the diameter of the end section of the shaft 22 to mate with resistance, for instance, as a forced fit. At the end section facing away from the shoulder, the hole of the metal bushing 27 has a conical flare 29 (FIG. 6), which facilitates pressing the bushing onto the shaft 22.

The drive motor 18 is supported in a frame 30, which is designed as a connected plastic part and is clamped with the interposition of resilient support elements 31 and 32 between the bottom of the grinding cup 16 braced in the housing 11, and the bottom 12 of the housing 11. While a circular, rubber-elastic ring serves as the support element 32 at the bottom of the grinding cup 16, the support element 31 is designed as a rubber grommet with oval cross section. The support element 32 is clamped at a rib 33 projecting from the bottom 12 of the housing 11 and, at a rib 33′ projecting from the frame 30 securing the drive motor against torsion.

At about its center, the frame 30 has a depression 34 (FIG. 5) which is matched to the outer contour of one leg of the stator 19 designed as a U-shaped pole piece. The stator 19 can be placed into this depression with a tight fit in such a manner that it sits tight in the frame 30 without additional fastening elements. To this end, the stator 19 and the frame 30 are equipped with a system of mutually engaging detent elements, of which one is formed as a bar 35 which is located at the edge of the depression 34 and snaps, elastically deformably, behind a corresponding shoulder at the yoke of the stator 19 when the stator 19 is placed in the frame 30.

The drive motor 18 is supported with its shaft 22 in spherical bearings 36 and 36′ which lie in corresponding depressions of the frame 30 and are anchored by leaf springs 37 and 37′ clamped at the frame. It is equipped with carbon brushes 38 which are held by leaf springs 39 which are clamped at the frame 30 supporting the drive motor 18, as can be seen particularly in FIGS. 4 and 8.

One of the leaf springs 39 carrying the carbon brush 38 is at the same time a contact spring and is therefore part of a switch in the circuit of the drive motor 18, as the countercontact to a contact spring 40. The latter is equipped with a soldered-on silver contact 41, as seen in FIG. 8. It is located in the vicinity of a laterally projecting arm 42 at a vertically movable switch slider 43 which is guided along the inside of the housing 11 underneath the switching plunger 15 mounted in the cover 13. The contact spring 40 serves at the same time as a return spring for the switch slider 43.

The frame 30 carrying the drive motor 18 is equipped with a formed-on stress relief 44 for a cable 45 which serves to supply power to the drive motor. This stress relief is equipped, as can be seen particularly in FIG. 10, with a tab 47 which is flexibly fastened by a film hinge 46. The tip of tab 47 can be pushed into a cutout 48 in a plate 49 opposite the film hinge 46 and can thus be locked in its position firmly clamping the cable 45.

To fasten the beater blade 17 on the end section of the shaft 22, the bushing 27 is first placed up to the stop at its shoulder 28 into the central hole 26 of the beater blade 17 with an easily sliding fit. Then the bushing 27 with the beater blade 17 is pressed onto the shaft 22. When the end of the shaft 22 enters, the bushing 27 is expanded elastically or plastically against the fit of the central hole 26 in the beater blade 17 and thereby clamps the latter securely.

There are claimed:

1. In an electric motor-driven coffee mill having a housing with a grinding cup disposed therein above the bottom of the housing, a drive motor in the housing disposed beneath the bottom of the grinding cup, and a rotatably supported comminuting tool disposed above the bottom of the grinding cup and driven by the drive motor, the improvement comprising said grinding cup being at least approximately circular and obliquely arranged in said housing, said drive motor being a salient-pole motor with an asymmetrically arranged field coil, the axis of said salient-pole motor being inclined such that the field coil extends on one side beyond a projection of the cup perpendicular to the oblique plane of the grinding cup, and the contours of said salient-pole motor lie inside a cylinder formed by a projection of the cup perpendicular to a horizontal plane.

2. Coffee mill according to claim 1, wherein said housing is in cylindrical form with an interior diameter substantially equal to the exterior diameter of said cylinder enclosing said motor, formed by the projection of said grinding cup.

3. Coffee grinder according to claim 1, wherein said salient-pole motor is supported in a frame fabricated as a connected plastic part, which frame supporting the motor is clamped with the interposition of resilient support elements between the bottom of the inclined grinding cup braced in the housing and the bottom of the housing.

4. Coffee mill according to claim 3, wherein the frame is equipped with a depression which is fitted to a leg of the stator of said motor and which frame has at least one resilient detent element to snap-in the stator with a tight fit.

5. Coffee mill according to claim 3, wherein the shaft of the rotor of the salient-pole motor is supported in spherical bearings which are disposed in corresponding depressions of the frame and are anchored by leaf springs clamped at the frame.

6. Coffee mill according to claim 3, wherein the frame is equipped with a formed-on stress relief for a power supply cable of the salient-pole motor.

7. Coffee mill according to claim 3, wherein the salient-pole motor has a flat commutator and carbon brushes which are held by leaf springs which are clamped on one side of the frame carrying the drive motor.

8. Coffee mill according to claim 7, wherein at least one of said leaf springs is part of a switch in the circuit of the salient-pole motor.

9. Coffee mill according to claim 7, wherein said drive motor has its shafts insulated from its rotor with double plastic insulation against its shaft, and said comminuting tool has a central hole with a metal bushing pressed in the hole, which bushing is placed on the shaft.

10. Coffee mill according to claim 9, wherein the metal bushing has a shoulder, which rests against the communiting tool with a rim zone surrounding said central hole of said tool.

11. Coffee mill according to claim 10, wherein the bushing has a hole with a conical flare at its end section facing away from the shoulder to permit ready entrance of the shaft into the hole and where the hole other than the conical flare is of a dimension requiring a forced fit of the shaft.

12. Coffee mill according to claim 9, wherein the rotor of the drive motor is equipped with a disk-type commutator which has a central hole and is pulled onto a hub formed by a plastic spray coating around the shaft, said commutator being supported on its bottom side on the edge of a section of said double insulation enclosing a cavity.

* * * * *